US008350688B2

United States Patent
Wang et al.

(10) Patent No.: US 8,350,688 B2
(45) Date of Patent: Jan. 8, 2013

(54) SYSTEM AND METHOD FOR INDIRECT INDICATION OF TIRE PRESSURE LOSS

(75) Inventors: Zhengming Wang, Greenwood, IN (US); Gregory A. Jean-Baptiste, Fort Wayne, IN (US); Huihui Duan, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 334 days.

(21) Appl. No.: 12/714,684

(22) Filed: Mar. 1, 2010
(Under 37 CFR 1.47)

(65) Prior Publication Data
US 2011/0210841 A1 Sep. 1, 2011

(51) Int. Cl.
*B60C 23/00* (2006.01)
*B60C 23/02* (2006.01)
*G01M 17/00* (2006.01)

(52) U.S. Cl. ....... 340/443; 340/444; 340/442; 701/31.4; 701/31.7; 701/33.1; 116/34 R

(58) Field of Classification Search ............ 702/138
See application file for complete search history.

(56) References Cited

U.S. PATENT DOCUMENTS

| | | | |
|---|---|---|---|
| 6,788,191 B2 | 9/2004 | Kawasaki | |
| 6,822,561 B2 * | 11/2004 | Latarnik et al. ............... | 340/442 |
| 7,348,878 B2 | 3/2008 | Fogelstrom | |
| 2002/0036567 A1 * | 3/2002 | Larson ........................ | 340/442 |
| 2003/0076223 A1 * | 4/2003 | Tominaga et al. ............ | 340/443 |
| 2005/0044946 A1 | 3/2005 | Agrotis | |
| 2005/0179528 A1 | 8/2005 | Kawasaki | |
| 2005/0258949 A1 * | 11/2005 | Iwazumi ...................... | 340/442 |
| 2006/0122747 A1 * | 6/2006 | Brown .......................... | 701/29 |
| 2006/0220811 A1 | 10/2006 | Griesser | |
| 2007/0069877 A1 | 3/2007 | Fogelstrom | |
| 2008/0262784 A1 * | 10/2008 | Massoni et al. ............... | 702/138 |

FOREIGN PATENT DOCUMENTS
DE 19625544 C1 8/1997

OTHER PUBLICATIONS

Niclas Persson and Fredrik Gustafsson, Indirect Tire Pressure Monitoring Using Sensor Fusion,Article, Mar. 4, 2002,pp. 1-8, Society of Automotive Engineers, Inc., Detroit, Michigan, U.S.

* cited by examiner

*Primary Examiner* — Albert Wong
*Assistant Examiner* — Pameshanand Mahase
(74) *Attorney, Agent, or Firm* — Jeffrey P. Calfa; Mark C. Bach

(57) ABSTRACT

A method of indirect tire pressure monitoring for indicating when a pneumatic tire on a wheel at one end of a motor vehicle axle is underpressurized relative to a pneumatic tire on a wheel at an opposite end of the axle while the vehicle is being driven on a road surface. ABS wheel sensors are used as inputs to a devoted processor for indirect tire pressure monitoring.

15 Claims, 1 Drawing Sheet

SYSTEM AND METHOD FOR INDIRECT INDICATION OF TIRE PRESSURE LOSS

FIELD OF THE INVENTION

This invention relates to motor vehicles that ride on pneumatic tires, and in particular it relates to a system and method using indirect measurement to indicate a difference in inflation pressure of pneumatic tires on wheels at opposite ends of an axle.

BACKGROUND OF THE INVENTION

The increased presence of ABS systems (antilock brake systems) on motor vehicles has led engineers to seek software methods for monitoring pneumatic tire pressure that use messages from the ABS controller because such methods can be highly cost effective due to the fact that each wheel is already equipped with a precision wheel speed sensor. The use of ABS wheel speed messages in methods for monitoring tire pressure are disclosed in various patents and other documents.

In July, 2001, the United States Department of Transportation published a document "Tire Pressure Monitoring System, FMVSS No. 138", summarizing ITPM (indirect tire pressure monitoring) project progress. That document represents that ITPM's can report tire underinflation when the tire pressure difference is greater than 20-30% of their placard pressure. This is due to the fact that the effective radius of a pneumatic tire decreases very slightly when a tire is underinflated by about 15 psi (pounds per square inch).

SUMMARY OF THE INVENTION

The preferred embodiment of the invention utilizes a devoted processor to process data that is present in messages on a data bus conforming to SAE Standard J1939 in a motor vehicle such as a truck and to send an alert to the driver when the result of processing data for two tires on a common axle discloses that pressure in one has changed from the amount of change in the other by a certain amount while the vehicle is being driven. The messages include messages from ABS sensors. The calculations are made with a high degree of statistical confidence, such as 90% confidence. By the same token, a false alert is avoided with the same confidence.

The processing is performed in the devoted processor by executing an algorithm that has been developed to be reasonably sensitive and reliable, with relatively high probability of giving a true alert indicative of a difference between pressure change in one tire relative to that in the other and/or uneven tire loading on opposite sides of the vehicle, and with relatively low probability of giving a false alert.

This invention is suitable for use on various motor vehicles equipped with 4-wheel ABS systems, it has been developed to provide ITPM for large trucks whose GVW exceeds 4536 kg. with either single-wheel or dual-wheel drive axles and that may have relatively larger tires and higher pressures than typical of smaller vehicles.

One general aspect of the invention relates to a method of indirect tire pressure monitoring for indicating when a pneumatic tire on a wheel at one end of a motor vehicle axle is underpressurized relative to a pneumatic tire on a wheel at an opposite end of the axle while the vehicle is being driven on a road surface.

The method comprises repeatedly calculating difference between a current measurement of effective radius of each tire relative to a reference value for effective radius of the same tire and processing the calculated differences for each tire to calculate a value of a first-order derivative of effective radius of the same tire and comparing the value of the first-order derivative of effective radius of one tire to the calculated value of the first-order derivative of effective radius of the other tire.

When the comparison of the values of the first-order derivatives of the respective tires discloses that the value of one of the first-order derivatives differs from that of the other of the first-order derivatives by more than a defined amount, that disclosure is used to determine if an alert for indicating that one tire is too underpressurized relative to the other should be issued.

Another general aspect relates to an indirect tire pressure monitoring system for indicating when a pneumatic tire on a wheel at one end of a motor vehicle axle is underpressurized relative to a pneumatic tire on a wheel at an opposite end of the axle while the vehicle is being driven on a road surface.

The system comprises: a respective sensor at each wheel or at each side of wheel for dual wheel axis that supplies the same data to an ABS system of the vehicle and to a devoted processor for indirect tire pressure monitoring.

The devoted processor is arranged to repeatedly execute an algorithm for calculating difference between a current measurement of effective radius of each tire relative to a reference value for effective radius of the same tire, to process the calculated differences for each tire to calculate a value of a first-order derivative of effective radius of the same tire and compare the value of the first-order derivative of effective radius of one tire to the calculated value of the first-order derivative of effective radius of the other tire.

When the comparison of the values of the first-order derivatives of the respective tires discloses that the value of one of the first-order derivatives differs from that of the other of the first-order derivatives by more than a defined amount, that disclosure is used to determine if an alert for indicating that one tire is too underpressurized relative to the other should be issued.

DESCRIPTION OF THE PREFERRED EMBODIMENT

Figure 1:
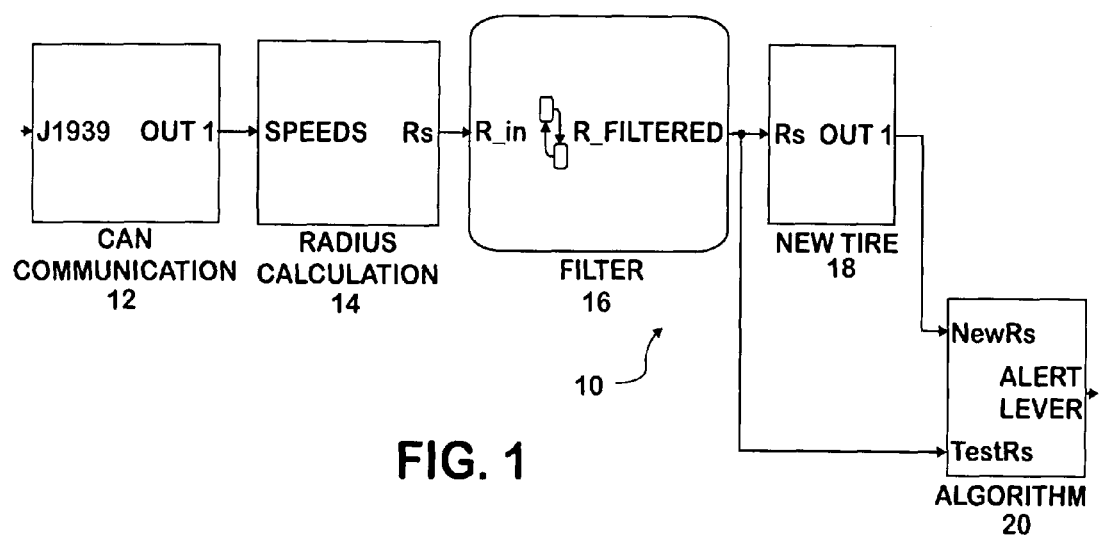
FIG. 1 is general schematic diagram of the inventive algorithm.

The effective radius of a pneumatic tire can be written as $r_j = r_j(p_j, v_j, T_j, l_j, x_{ij}, y_{kj})$, $j=1, 2, 3, 4$, $i,k=1, 2, 3, 4 \ldots$ where $j=1, 2, 3, 4$ indicate front left, front right, rear left, rear right wheels, $p_j$ is the pressure, $T_j$ is the ambient temperature, $v_j$ is wheel speed, $l_j$ is load, $x_{ij}$s are other factors which are virtually the same acting when acting on wheels on same axle while $y_{kj}$s are factors which act differently on each wheel. Due to the complicated relationships and unpredictable factors that may arise during driving, this generalized function cannot be developed with sufficient specificity to enable individual tire pressure to be directly monitored.

However, the following generalized functional relationship can be further developed in a way that enables indirect monitoring of tire pressure in each of a pair of tires: $r_j = r_{j0} + dr_j$ where $r_{j0}$ is the effective radius of a pneumatic tire under a specified condition, such as the standard condition defined by the tire manufacturer. Examples of other specified conditions are the tire being under load on a vehicle, the tire being at a specified ambient temperature, such as room temperature for example, zero speed, etc.

$dr_j$ is the first order derivative which may be considered a small quantity compared with $r_{j0}$ under normal and near-normal driving conditions. Higher order derivatives are quite small and can be ignored if desired for simplicity in developing an algorithm that can be executed by a processor.

Because of manufacturing tolerances and vehicle-to-vehicle variations, $r_{j0}$ for each wheel is likely to be slightly different. Effective radii of most truck tires are about 0.5 m. A 0.05% tolerance equates to $0.25 \times 10^{-3}$ m.

Tests by one source have disclosed that a 10 PSI difference between the front tires will cause the effective radius to change about $0.8 \times 10^{-3}$ m on average, but with a rather large standard deviation, as will be more fully discussed later. Because the dimensions are of the same order of magnitude, the tolerance associated with them will strongly affect the measurement of the effective radius due to the pressure change. To avoid this, the inventors focus attention on $dr_j$ instead of $r_j$, directly.

The derivative dr can be written as $$dr_j = \frac{\partial r_j}{\partial p_j}dp_j + \frac{\partial r_j}{\partial T_j}dT_j + \frac{\partial r_j}{\partial v_j}dv_j + \frac{\partial r_j}{\partial l_j}dl_j + \frac{\partial r_j}{\partial x_{ij}}dx_{ij} + \frac{\partial r_j}{\partial y_{kj}}dy_{kj};$$

where j=1, 2, 3, 4 i,k=1, 2, 3, 4 . . . .

Because $x_{ij}$ are factors which are the same for each tire, the subscripts of j can be omitted. The same is true for ambient temperature, and hence the subscripts on T can also be omitted.

This leaves:

$$dr_j = \frac{\partial r_j}{\partial p_j}dp_j + \frac{\partial r_j}{\partial T}dT + \frac{\partial r_j}{\partial v_j}dv_j + \frac{\partial r_j}{\partial l_j}dl_j + \frac{\partial r_j}{\partial x_i}dx_i + \frac{\partial r_j}{\partial y_{kj}}dy_{kj},$$

where j=1, 2, 3, 4, i,k=1, 2, 3, 4 . . . .

Many factors are uncontrollable during driving. To reduce these effects as much as possible, consider first the difference of derivatives of two front tires. (It is assumed that the loads on the front tires are same, although that may be not true for rear tires on uneven conditions):

$$dr_1 - dr_2 =$$
$$\left(\frac{\partial r_1}{\partial p_1}dp_1 - \frac{\partial r_2}{\partial p_2}dp_2\right) + \left(\frac{\partial r_1}{\partial T} - \frac{\partial r_2}{\partial T}\right)dT + \left(\frac{\partial r_1}{\partial v_1}dv_1 - \frac{\partial r_2}{\partial v_2}dv_2\right) +$$
$$\left(\frac{\partial r_1}{\partial l} - \frac{\partial r_2}{\partial l}\right)dl + \left(\frac{\partial r_1}{\partial x_i} - \frac{\partial r_2}{\partial x_i}\right)dx_i + \left(\frac{\partial r_1}{\partial y_{k1}}dy_{k1} - \frac{\partial r_2}{\partial y_{k2}}dy_{k2}\right)$$

where i,k=1, 2, 3, 4 . . . .

The same model tires should have similar behavior with small tolerances for load, temperature, and other factors so that these effects will be second order of small quantities and can be neglected when the first order contributions are considered, thereby leaving:

$$dr_1 - dr_2 =$$

-continued
$$\left(\frac{\partial r_1}{\partial p_1}dp_1 - \frac{\partial r_2}{\partial p_2}dp_2\right) + \left(\frac{\partial r_1}{\partial v_1}dv_1 - \frac{\partial r_2}{\partial v_2}dv_2\right) + \left(\frac{\partial r_1}{\partial y_{k1}}dy_{k1} - \frac{\partial r_2}{\partial y_{k2}}dy_{k2}\right)$$

where k=1, 2, 3, 4, . . . .

The contribution of the second term during normal driving should be a small second order quantity (both $$\frac{\partial r_i}{\partial v_i}$$

and $dr_j$ are first order quantities) that can be neglected. Even on curve driving, it can also be considered as a second order small quantity. If a vehicle's width is a, the curvature of the road is R, a first wheel (Wheel 1) is on the inside of the curve and a second wheel (Wheel 2) is on the outside, $v_1$ and $v_2$ will not be much different. Therefore, we can consider $$\frac{\partial r_1}{\partial v_1} \approx \frac{\partial r_2}{\partial v_2},$$

and can write the function as $$\frac{\partial r_1}{\partial v_1}(dv_1 - dv_2).$$

According to the standard WdK (German Rubber Enterprise Association)

$$\frac{\partial r_1}{\partial v_1} \approx 0.0001 * r_1$$

(m/(km/h)), usually $d(v_1-v_2)<10^{-2}$ mile/h on curve driving, is small so that the contribution will be on the order of $10^{-6}$ m, a small second order quantity that can be neglected. However, the curve driving itself causes much bigger "effective radius" change, to be discussed later. The third term can usually be filtered out unless some factors last for a long period, also to be discussed later.

Discussion now focuses on the first term.

Under normal condition, $$p_1 \cong p_2, dp_1 \cong dp_2 = 0, \frac{\partial r_1}{\partial p_1} = \frac{\partial r_2}{\partial p_2},$$

making the first term of the right side of the above equation equal to 0.

If tire pressure changes such that $dp_1 \neq dp_2$ and $$\frac{\partial r_1}{\partial p_1} \neq \frac{\partial r_2}{\partial p_2}$$

(if $dp_1$, $dp_2$ have a significant difference)

$$dr_1 - dr_2 = \frac{\partial r_1}{\partial p_1} dp_1 - \frac{\partial r_2}{\partial p_2} dp_2.$$

Should one tire leak (assume right front) and the other is normal (left front):

$$dr_1 - dr_2 = -\frac{\partial r_2}{\partial p_2} dp_2$$

and because $$\frac{\partial r_1}{\partial p_1}, \frac{\partial r_2}{\partial p_2}$$

are not constants, $dr_1-dr_2$ is not a linear function of $dp_2$.

Thus far the discussion has focused on the effective radius change due to physical factors. It is necessary to consider another factor: the effective radius change due to calculation. That happens on curve driving. It is not decided by the physical factor as mentioned in the second term, but is decided by kinetic calculation by the formula for curve driving.

Let $\phi$ be the angle of the curve, and a be the distance between the two front steering wheels. The inside wheel travels the distance is $R\phi$ and outside wheel travels the distance is $(R+a)\phi$. The contribution due to curve driving will be:

$$\frac{dr_1 - dr_2}{r_2} \cong \frac{a}{R}$$

Usually the width a is about 2.5 m, and so if we set curvature of the driving curve as 2500 m., a/R is about 0.1%, or the difference is $0.5 \times 10^{-3}$ m.

The measurement of $dr_1-dr_2$ is important to the algorithm. $dr_j$ is the difference between the current effective radius of a tire (with the tire either cold or warm) and the effective radius of the tire when first put into service on the vehicle, typically as a new tire. The meaning of j is given in Paragraph [0015].

$dr_0$ is the difference between the current effective radius of a tire and the effective radius that is first calculated after a limited amount of time has elapsed upon the vehicle being first driven after having been parked for an amount of time sufficient to allow the tires to assume substantially ambient temperature. The limited amount of time corresponds to a warm-up time for the tires and is typically preset (15 minutes for example), but can be determined on the basis of certain conditions. $dr_j$ is used as a reference to decide if a significant pressure leak during the parking period. It can give a quick alert. The threshold is bigger than that using $dr_j$.

The high resolution wheel speed data has the precision of 1/256 km/h (0.004 km/h). At a vehicle speed of 40 km/h, the relative error will be 0.01% (for each wheel, this is only the measurement error, we have not included the physical error for the tire yet, but it will be discussed later), or the order of the $0.05 \times 10^{-3}$ m. Testing has disclosed that the value of $dr_1 - dr_2$ when one tire is 10 PSI low, is about $0.28 \times 10^{-3}$ m.

However, testing has disclosed that during driving, the variation in the effective radius of a tire is significant. For example the standard deviation has been seen to have a range from about $1.5 \times 10^{-3}$ m. to about $4.0 \times 10^{-3}$ m., and that makes it difficult to pick up useful information. The inventive algorithm however functions to extract the useful information with a reasonably high degree of confidence in accuracy of the extracted information. Moreover, the algorithm can be used in a circumstance where the tires have slightly different initial radii.

FIG. 1 shows a system 10 that performs the method. System 10 comprises five sub-systems: CAN communication 12, Radius Calculation 14, Filtering 16, New Tire 18, and Algorithm 20.

Figure 2:
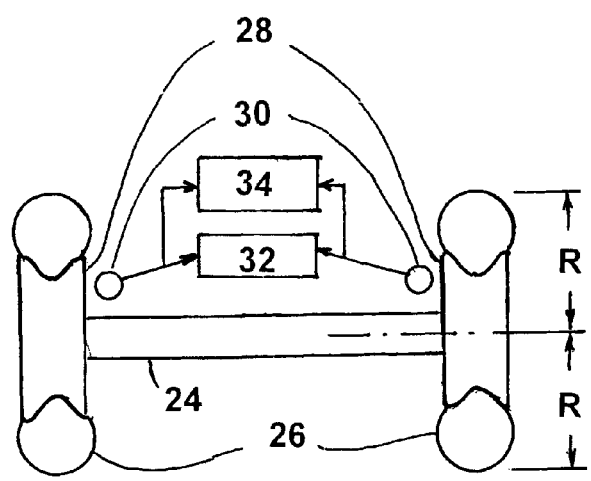
FIG. 2 is a schematic drawing of a motor vehicle axle and certain associated components.

FIG. 2 shows a motor vehicle axle 24 having pneumatic tires 26 on wheels 28 at opposite ends of axle 24. A respective sensor 30 at each wheel 28 supplies wheel speeds messages for each wheel to an ABS system (antilock brake system) 32 of the vehicle and to a devoted processor 34 for indirect tire pressure monitoring. Tire radius is indicated by the letter R.

The method comprises reading speed of each wheel from the associated ABS wheel speed sensor and vehicle speed (sub-system, or sub-method 12), calculating the effective radius of each tire (sub-system or sub-method 14), removing noise from the input data (sub-system or sub-method 16), calculating an effective radius for a newly installed tire (sub-system or sub-method 18), and judging the tire pressure condition and determining the alert level that is displayed to the driver (sun-system or sub-method 20).

The Radius Calculation sub-system 14 performs a sub-method of calculating the effective radii as described above.

The Filtering sub-system 16 performs five functions: removing bad messages, removing low speed messages, removing curve driving messages, removing noises, and controlling the deviations. If a calculated effective radius is greater than 0.6 m or less than 0.4 m, the calculation is discarded. If the vehicle speed is less than 25 km/h, the calculation is also discarded because an ABS signal is typically not sufficiently accurate at low speed for the inventive algorithm to produce an accurate result with a high degree of probability. Because the messages from J1939 have absolute precision, the relative error will be five times greater at a vehicle speed of 24 km/h (15 mph) than at a vehicle speed of 112 km/h (70 mph). For example, the wheel relative speed has a resolution of 1/16 (km/h), it has the relative error of 0.05% at 112 mk/h (70 mph) and 0.25% at 24 km/h (15 mph).

When $$\left|\frac{\omega_1 - \omega_2}{\omega_1 + \omega_2}\right| > 0.0005, \left|\frac{\omega_3 - \omega_4}{\omega_3 + \omega_4}\right| > 0.0005,$$

and $(\omega_1-\omega_2)(\omega_3-\omega_4) \geqq 0$ are true, the vehicle is on curve driving, and the calculations are also discarded. 0.0005 is from the example discussed earlier.

In the calculation performed by the New Tire sub-system 18, the algorithm uses the mean value of 2560 calculations of effective radius to obtain the reference value for effective radius that is used by the algorithm once the tires have warmed up. During the normal indirect monitoring process, the algorithm use an average from 256 calculations. The standard deviation of the effective radius from test record is about 0.0015 m-0.0040 m. To ensure with a 95% confidence level that the error range of $abs(dr_1-dr_2)$ is less than 0.00028 m (from the analysis of test data), we should have at least 256 calculations that can be averaged each time that the current effective radius is being calculated.

The New Tire sub-system 18 saves the initial radii for tires when first installed on the vehicle.

The Algorithm sub-system 20 judges the tire conditions.

Assign a parameter AL as an alert level, and a parameter CR as the maximum allowable difference between allowed (in this example 0.00028 m, 95% confidence level from certain empirically obtained test data)

While the initial values of AL, CR are set to be zero, a value of CR is entered at the beginning of execution of the algorithm.

The algorithm sets a value for AL based on the result of calculating $dr_1 - dr_2$.

If $dr_1 - dr_2 < -CR$, and AL is zero, AL remains at zero, but if AL had been greater than zero, its value would be decremented by one, and if AL had been less than zero, its value would be incremented by one.

If $dr_1 - dr_2 < CR$, and AL is zero, AL remains at zero, but if AL had been greater than zero, its value would be incremented by one, and if AL had been less than zero, its value would be decremented by one.

Whenever the absolute value of AL reaches a predetermined value, an alert is given to indicate that the calculated rate of change of effective radius for one tire differs from that for the other tire by an amount that indicates with high probability that one tire is sufficiently underpressurized to deserve attention.

The algorithm uses the change of effective radius (dr1, dr2) as the basic variable instead of the effective radius. By comparing the change of effective radius on left and right side on the same axle (single wheel, or equivalent effective radius for dual wheels), this algorithm removes the influence of tire wear, and manufacturing tolerances for new tires. Most of the effective radius change caused by those factors, and others like speed, evenness of load, temperature, road condition, etc., act on both sides of the same axle are essentially canceled out. Any difference caused by these factors can be considered as second order small quantity, and omitted in most cases by comparing only the first order quantity, i.e., change in the effective radius caused by pressure changes and/or uneven tire loading.

The devoted processor collects ABS wheel speed data and removes the influence of noise, curve driving, and low speed operation so as to allow only data with high probability of being accurate to be used in the calculation of effective tire radius. By using the effective radius of the tire when first put into service on the vehicle as the reference value during warm-up periods, the influence of changes that are occurring as the tires are becoming warmer is avoided.

Once the tires have warmed up, the effective radii calculated substantially at the completion of the warm-up period are subsequently used as the reference values, being used each time until the vehicle's engine is turned off. When a tire is changed, a signal can be given to the devoted processor, such as by a push button switch, to cause the algorithm to calculate the initial effective radius for that tire.

While a presently preferred embodiment of the invention has been illustrated and described, it should be appreciated that principles of the invention apply to all embodiments falling within the scope of the following claims.

What is claimed is:

1. A method of indirect tire pressure monitoring for indicating when a pneumatic tire on a wheel at one end of a motor vehicle axle is underpressurized relative to a pneumatic tire on a wheel at an opposite end of the axle while the vehicle is being driven on a road surface, the method comprising:
   repeatedly calculating difference between a current measurement of effective radius of each tire relative to a reference value for effective radius of the same tire;
   processing the calculated differences for each tire to calculate a value of a first-order derivative of effective radius of the same tire and comparing the calculated value of the first-order derivative of effective radius of one tire to the calculated value of the first-order derivative of effective radius of the other tire; and
   when the comparison of the calculated values of the first-order derivatives of the respective tires discloses that the value of one of the first-order derivatives differs from that of the other of the first-order derivatives by more than a defined amount, using that disclosure to determine if an alert for indicating that one tire is too underpressurized relative to the other should be issued.

2. A method as set forth in claim 1 wherein the reference value for effective radius of each tire is determined when the respective tire was initially installed on the axle by processing data representing angular speed of the respective wheel and traveling speed of the vehicle according to an algorithm that repeatedly calculates the effective radius of the respective tire and that calculates the mean of a number of the repeated calculations of the effective radius for the respective tire, that number having been statistically proven to provide each calculated mean with a certain probability of being within a defined margin of error for the calculated mean.

3. The method as set forth in claim 2 wherein the number has been statistically proven to provide each calculated mean with at least a 90% probability of being within a predefined acceptable margin of error for the calculated mean.

4. The method as set forth in claim 2 wherein the effective radius of each tire determined when the respective tire was initially installed on the axle is used as the reference value for a limited time commencing with driving of the vehicle after a period of time during which the vehicle was not driven and which was sufficient to allow the tires to assume substantially ambient temperature.

5. The method as set forth in claim 4 wherein after the limited time has elapsed, the reference value that is used for effective radius of each tire is switched to a measured value for effective radius obtained substantially contemporaneously with elapse of the limited time.

6. The method as set forth in claim 1 comprising obtaining the measurement of effective radius of each tire by processing data from a respective sensor at each wheel that also supplies the same data to an ABS system (antilock brake system) of the vehicle.

7. The method as set forth in claim 1 wherein the step of processing a current measurement of effective radius of each tire relative to a reference value for effective radius of the same tire comprises calculating each current measurement by calculating the mean of a number of individual measurements of the effective radius and then using the calculated mean for each tire as the current measurement of effective radius of the respective tire in the calculation of difference between a current measurement of effective radius of each tire relative to the reference value for effective radius of the same tire.

8. The method as set forth in claim 1 wherein the step of using disclosure that one of the calculated differences differs from that for the other by more than a defined amount to determine if an alert for indicating that one tire is too underpressurized relative to the other should be issued comprises incrementing or decrementing an alert parameter, and further including issuing an alert when the absolute value of the alert parameter equals a predetermined limit.

9. An indirect tire pressure monitoring system for indicating when a pneumatic tire on a wheel at one end of a motor vehicle axle is underpressurized relative to a pneumatic tire on a wheel at an opposite end of the axle while the vehicle is being driven on a road surface, the system comprising:

a respective sensor at each wheel that supplies the same data to an ABS system (antilock brake system) of the vehicle and to a devoted processor for indirect tire pressure monitoring; and wherein the devoted processor is arranged to repeatedly execute an algorithm for calculating difference between a current measurement of effective radius of each tire relative to a reference value for effective radius of the same tire, to process the calculated differences for each tire to calculate a value of a first-order derivative of effective radius of the same tire and compare the calculated value of the first-order derivative of effective radius of one tire to the calculated value of the first-order derivative of effective radius of the other tire, and when the comparison of the calculated values of the first-order derivatives of the respective tires discloses that the value of one of the first-order derivatives differs from that of the other of the first-order derivatives by more than a defined amount, using that disclosure to determine if an alert for indicating that one tire is too underpressurized relative to the other should be issued.

10. The indirect tire pressure monitoring system as set forth in claim 9 wherein the algorithm operates to determine the reference value for effective radius of each tire when the respective tire was initially installed on the axle by processing data representing angular speed of the respective wheel and traveling speed of the vehicle to repeatedly calculate the effective radius of the respective tire and to calculate the mean of a number of the repeated calculations of the effective radius for the respective tire, that number having been statistically proven to provide each calculated mean with a certain probability of being within a defined margin of error for the calculated mean.

11. The indirect tire pressure monitoring system as set forth in claim 10 wherein the number has been statistically proven to provide each calculated mean with at least a 90% probability of being within a predefined margin of error for the calculated mean.

12. The indirect tire pressure monitoring system as set forth in claim 10 wherein algorithm operates to use the effective radius of each tire determined when the respective tire was initially installed on the axle as the reference value for a limited time commencing with driving of the vehicle after a period of time during which the vehicle was not driven and which was sufficient to allow the tires to assume substantially ambient temperature.

13. The indirect tire pressure monitoring system as set forth in claim 12 wherein after the limited time has elapsed, the algorithm operates to switch the reference value from the one that was being used for effective radius of each tire to a measured value for effective radius obtained substantially contemporaneously with elapse of the limited time.

14. The indirect tire pressure monitoring system as set forth in claim 9 wherein the algorithm operates to process a current measurement of effective radius of each tire relative to a reference value for effective radius of the same tire by calculating the means of a number of current measurement of effective radius for the same tire and then using the calculated mean for each tire as the current measurement of effective radius of each tire when calculating difference between a current measurement of effective radius of each tire relative to the reference value for effective radius of the same tire.

15. The indirect tire pressure monitoring system as set forth in claim 9 wherein the algorithm is arranged to use disclosure that one of the calculated differences differs from that for the other by more than a defined amount to determine if an alert for indicating that one tire is too underpressurized relative to the other should be issued by incrementing or decrementing an alert parameter, and then issuing an alert when the absolute value of the alert parameter equals a predetermined limit.

* * * * *